H. B. HORTON.

MECHANICAL MUSICAL INSTRUMENT.

No. 9,830. Reissued Aug. 9, 1881.

Witnesses:-

Louis M. Whitehead

Geo. H. Haynes

Inventor:-

Henry B. Horton by his Attorneys

Brown & Brown

UNITED STATES PATENT OFFICE.

HENRY B. HORTON, OF ITHACA, NEW YORK.

MECHANICAL MUSICAL INSTRUMENT.

SPECIFICATION forming part of Reissued Letters Patent No. 9,830, dated August 9, 1881.

Original No. 196,529, dated October 30, 1877. Application for reissue filed November 2, 1880.

*To all whom it may concern:*

Be it known that I, HENRY B. HORTON, of Ithaca, in the county of Tompkins and State of New York, have invented a new and useful Improvement in Wind Musical Instruments, which improvement is fully set forth in the following specification and accompanying drawings, in which—

Figure 1:
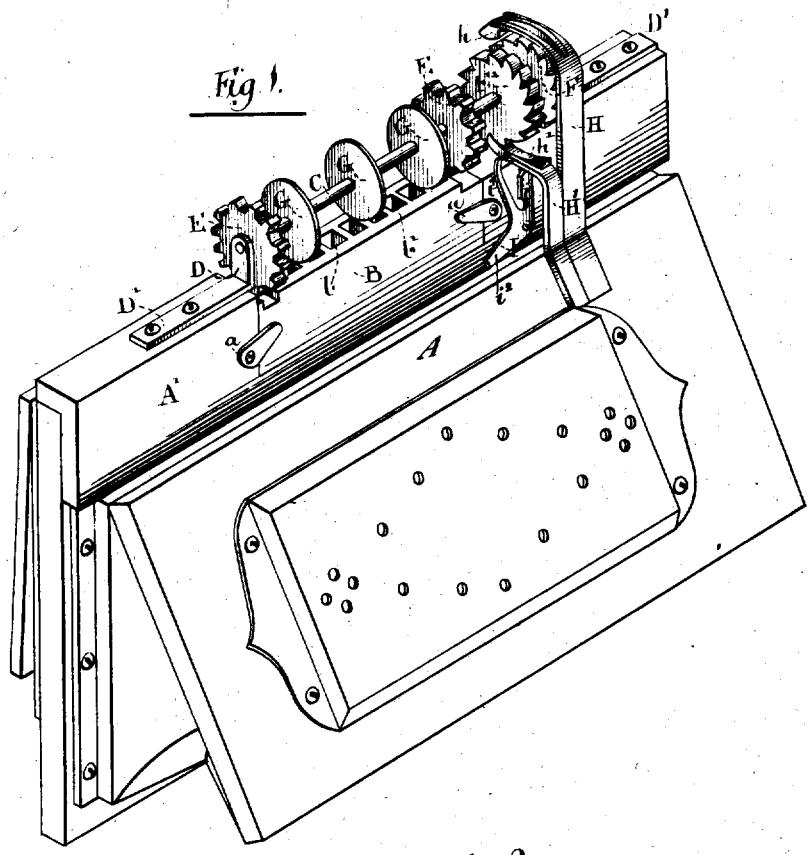
Figure 2:
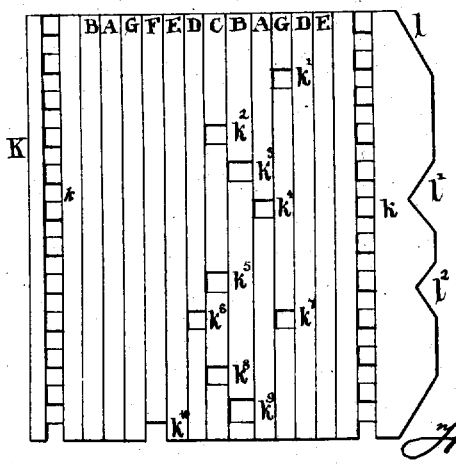

Figure 1 is a perspective representation of an instrument of the accordion class embracing my improvement. Fig. 2 is a plan view of a perforated strip, which I term the "valve" or "valve-sheet," forming a part of my invention, and used in connection with the instrument.

My invention is specially applicable to wind-instruments having pipes or reeds, such as are usually operated by keys and supplied with air through the action of bellows; and its object is to provide a simple and convenient instrument whereby tunes may be played by persons unacquainted with music, and learners assisted in acquiring a knowledge of musical notes.

My invention consists in the combination, in a musical instrument, of bellows, sound-producing devices, a traveling music-sheet for controlling the operation of said sound-producing devices, and a ratchet-wheel and pawl for feeding the music-sheet, the whole being so organized that the bellows when operated will effect the operation of the pawl and the feeding or travel of the music-sheet intermittently.

It also consists in the combination, with a music-sheet and means for feeding the same, of an auxiliary feed mechanism, whereby its feed may be accelerated.

It also consists in the combination, with a music-sheet, of a mechanism for feeding it and controlled by it.

It also consists in the combination of a music-sheet and a presser of novel form for holding the music-sheet to its rest.

It also consists in the combination of a music-sheet and a presser arranged and adapted to serve as means for feeding the music-sheet.

In the drawings, A represents the bellows by which the wind necessary for the operation of the instrument is induced; B, the reed-board, containing cells *b b'*, fitted with reeds of different pitch, for producing the various musical notes. The reed-board is shown as made separate from the frame or part A' of the instrument, in which it fits, and as susceptible of removal sidewise therefrom, buttons *a* being employed to retain it in place when in use. The wind induced by the bellows A is caused to pass through the cells *b'* of the reed-board, and cause the speaking of the reeds therein.

Several reed-boards, B, of varying compass, may be provided for the instrument, giving it a more extensive range.

The operation of the reeds is controlled by what I term a "music-sheet" or "valve-sheet," K, which travels over the top of the reed-board, the top of the reed-board forming a rest for said valve-sheet. This valve-sheet K is made of card-board or other suitable thin material. It has on each side a row of equidistant perforations, *k k*, to receive the teeth of wheels E, carried by the shaft C, when it is applied to the instrument, the two working after the manner of, and in reality constituting, racks and pinions, and it has perforations $k' k^2$, &c., which, when opposite the reed-cells *b b'*, permit the passage of wind through the same.

To the part A' of the instrument are attached standards D D, having bearings which receive the journals of a rotary shaft, C. As here shown, these standards are made with feet D', whereby they are supported. This shaft C can be rotated at greater or less speed, in the manner hereinafter described.

The spur-wheels E E, engaging with the valve-sheet K, as explained, serve to move it forward over the top of the reed-board, and ratchet-wheels F F', arranged on said shaft, are the means whereby motion is transmitted thereto. Plain disks G G G, arranged on said shaft, press the valve-sheet down on the partitions between the reed-cells *b'* of the reed-board and hold the sheet in close contact with the top of the reed-board. These disks constitute a rotary presser, and one, moreover, which permits of the passage of air through or past it.

H H' are bent arms, connected with or attached to the movable board of the bellows A, and respectively carrying clicks or pawls *h h'*, which engage, respectively, with the ratchet-wheels F F', to cause the rotation of the shaft C. When the movable board of the bellows A is moved inward by the hand of the operator the pawl or click $h$ of the arm H draws the ratchet-wheel F over a short distance, and when the said movable board is moved or allowed to move outward the pawl or click $h$ plays over the teeth of the ratchet-wheel F, and takes a new hold, so as to be ready to draw the wheel forward again when the said movable board is next moved inward. Thus it will be seen that the bellows A not only induce the wind for operating the reeds, but also serve to operate the valve-sheet, and, in fact, constitute the prime mover of the entire instrument. I desire it to be observed, also, that I thus produce an intermittent feed of the valve-sheet, it being alternately left stationary and fed forward, for such a feed is productive of important results.

The perforations $k'$ $k^2$, &c., which are intended to effect the sounding of notes of ordinary length, need only be as large as the reed-cells, because the dwell in the feed of the valve-sheet will allow the notes to sound for the desired length of time. For notes which are to be sounded for more than the ordinary length of time, slightly longer perforations $k'$ $k^2$, &c., may be made. By thus enabling a short perforation to subserve the purpose of a much longer one in a valve-sheet having a continuous feed, I am enabled to use a much shorter valve-sheet.

The arm H′ may be in constant operation to impart motion through the ratchet-wheel F′ to the shaft C, or it may operate only from time to time. Its operation is controlled by a bent lever, I, pivoted to the part A′ of the instrument. This arm H′, the ratchet-wheel F′, and the lever I constitute an auxiliary mechanism whereby the motion of the valve-sheet may be accelerated throughout the whole or any portion of a tune. The bent lever has three arms, $i$ $i'$ $i^2$. The arm $i$ extends upwardly and bears against the arm H′. The arm $i'$ also extends upwardly, and it bears against the adjacent edge of the valve-sheet; and the arm $i^2$ extends laterally, and constitutes a weight whereby the arm $i'$ is kept in contact with the edge of the valve-sheet. When the lever is allowed by the edge of the valve-sheet to move nearer the reed-board, the pawl or click $h'$ engages with the ratchet-wheel F′, and then at each outward movement of the movable board of the bellows A the said click or pawl pushes the under portion of the wheel F′ forward, and hence the valve-sheet is fed at each movement of the movable board of the said bellows. When the intermediate arm, $i'$, of the lever I is pressed against by the valve-sheet, the lever serves to throw the click or pawl $h'$ out of contact with teeth of the ratchet-wheel F′. There may be more than one of these accelerating-wheels F′ and accompanying levers I.

The perforations $k'$ $k^2$, &c., of the valve-sheet are of equal width with the mouths of the reed-cells $b$ $b'$, and are made at suitable intervals and in proper places longitudinally of the valve-sheet and in line with the pipes. These openings, as before explained, may be made of various lengths, so as to govern the duration of the note, making a semibreve, crotchet, quaver, &c., as may be required. That portion of the valve-sheet not thus cut away being pressed firmly down by the disks G G G closes the mouths of all the reed-cells except the one which may be immediately under one of the openings, and prevents air from escaping from them. Consequently they emit no sound. A separate valve-sheet is provided for each tune. The number, length, and position of the openings $k'$ $k^2$, &c., in each correspond to those of the notes in the tune, which are sounded successively as each opening comes over the proper reed-cell.

The edge of the valve-sheet which operates the lever I has indentations $l$ $l'$, &c., at those places where a more than ordinarily rapid succession of the notes is required, and in pieces demanding a quick movement the valve-sheet may be made narrower throughout its length, so that the click $h'$ may constantly engage the wheel F′.

When it is desired to perform a tune, the appropriate valve-sheet is placed over the reed-board B, so that the perforations $k$ $k$ at the edges of the sheet may be engaged by the teeth of the wheels E E. Working the bellows A by moving the movable board with the hand reciprocates the arms H H′, causing the click $h$ to successively engage the teeth of the wheel F, and in some cases the click $h'$ to engage with the wheel F′, rotating the shaft C and advancing the valve-sheet K. Each of the openings $k$ $k^2$, &c., is thus brought in its due order over the corresponding reed-cell $b$ $b'$, permitting the passage of air through the same, and the note is sounded. Where the valve-sheet K is of full width, its edge, pressing against the middle arm, $i'$, of the bent lever I, presses that lever back, and the click $h'$ does not engage the wheel F′; but where the edge of the sheet is cut away, the horizontal arm $i^2$ of the lever falling by gravity, the upper edge of the vertical arm $i$ is brought into contact with the under side of the click $h'$, throwing it up, so that it engages with the wheel F′, which then acts alternately with the wheel F, imparting more rapid rotation to the shaft C, and, by accelerating the motion of the valve-sheet, quickens the movement of the piece.

Though I have only represented my invention as applied to an accordion, or instrument wherein the bellows is operated by the hand of the operator applied thereto, yet it is obvious that it is applicable in part to instruments in general having a plurality of pipes, tubes, or reeds, and that the devices shown may be modified in various particulars without departing from the essential features of the invention. For example, in certain cases a pedal or treadle might be used to operate the devices which move the valve-strip, or the same might be actuated by automatic mechanism. The arrangement of the click-bearing arms H H′, clicks, wheels, and disks, or substitutes therefor, may also be variously modified.

I am aware that it is old to provide a musical instrument with a music-sheet, a rest therefor, and a roller at one side of said rest, under which the music-sheet passes; but such arrangement is not as effective to prevent leakage as when the roller is arranged immediately over the rest, and I do not claim it as of my invention.

Having thus described my invention, what I claim as new, and desire to secure by Letters Patent, is—

1. In a musical instrument, bellows, sound-producing devices, a traveling music-sheet controlling the operation of said sound-producing devices, and a ratchet-wheel and pawl for feeding said music-sheet, the whole being so combined and organized that the bellows, when operated, will effect the operation of the pawl and the feeding or travel of the music-sheet intermittently, substantially as specified.

2. In combination with the bellows A, the arms H H′, secured thereto and operated thereby, and provided with clicks *h h′*, substantially as and for the purposes specified.

3. In combination with the cog-wheels E E, the ratchet-wheels F F and clicks *h h′*, for operating the valve-propelling mechanism and giving a quick movement thereto, substantially as described.

4. In a musical instrument, the combination of sound-producing devices, a music-sheet for controlling the operation of the same, means for feeding the music-sheet, and an auxiliary mechanism which may be brought into operation to accelerate the feed of the music-sheet, substantially as specified.

5. In a musical instrument, the combination of sound-producing devices, a music-sheet for controlling the operation of the same, means for feeding the music-sheet, and an auxiliary mechanism controlled by the edge of the music-sheet and capable of being brought into play to accelerate the feed of the music-sheet, substantially as specified.

6. In a musical instrument, the combination of sound-producing devices, a music-sheet controlling their operation, and an auxiliary feed mechanism for regulating the feed of the music-sheet controlled, by said music-sheet, substantially as specified.

7. In combination with arms H′ and clicks *h′*, the bent lever I, substantially as and for the purpose specified.

8. The combination and arrangement of arm H′, click *h′*, bent lever I, and wheel F′, for giving a quick or alternate movement with the wheel F to the valve-sheet, substantially as specified.

9. The combination and arrangement of the arms H H′, clicks *h h′*, bent lever I, shaft C, wheels E E F F′, and clicks G G G, substantially as shown and described, and for the purpose specified.

10. The valve-sheet K, constructed upon one or both sides with lateral indentations *l l′*, &c., to give a quick movement to the music, substantially as specified.

11. The valve-sheet K, constructed with apertures *k k*, note-apertures *k′ k²*, &c., and lateral indentations *l l′*, &c., substantially as and for the purpose described.

12. In a musical instrument, the combination of a reed-board fitted with reeds and having its top made to form a rest, a music-sheet for controlling the operation of the reeds, and a rotary presser arranged immediately above the rest and holding the music-sheet thereto, substantially as specified.

13. In a musical instrument, the combination of a reed-board fitted with reeds and having its top made to form a rest, a music-sheet for controlling the operation of the reeds, and a rotary presser arranged immediately above the rest, holding the music-sheet thereto, and constructed to permit of the passage of air through it, substantially as specified.

14. In a musical instrument, the combination of a reed-board fitted with reeds and having its top made to form a rest, a music-sheet controlling the operation of the reeds, and a rotary presser arranged and adapted to operate as means for feeding the music-sheet, substantially as specified.

15. In combination with the valve-sheet K, constructed with apertures *k k*, the cog-wheels E E, and disks G G, mounted on shaft C, for holding the valve-sheet down in place and advancing it over the cells *b b′*, substantially as described.

16. In combination with the wind-chest or bellows A A′, the reed-board B′, made readily detachable from the body of the instrument, substantially as and for the purpose described.

HENRY B. HORTON.

Witnesses:
M. VAN CLEEF,
H. M. HIBBARD.